United States Patent [19]

Perisic

[11] Patent Number: 5,029,980
[45] Date of Patent: Jul. 9, 1991

[54] VIEWING DEVICE

[76] Inventor: Zoran Perisic, Gwynfenton, White Well, St. Teath, Nr. Bodmin, Cornwall, England

[21] Appl. No.: 256,508

[22] Filed: Oct. 12, 1988

[30] Foreign Application Priority Data

Oct. 12, 1987 [GB] United Kingdom ............... 8723953

[51] Int. Cl.$^5$ .............................................. G02B 27/26
[52] U.S. Cl. .................................................. 350/132
[58] Field of Search ................................. 350/130–132

[56] References Cited

U.S. PATENT DOCUMENTS 4,295,153 10/1981 Gibson ............................ 350/132 X
4,550,978 11/1985 Friedle .................................. 350/138

FOREIGN PATENT DOCUMENTS 3039109 5/1982 Fed. Rep. of Germany ...... 350/132
499403 1/1939 United Kingdom .
525427 8/1940 United Kingdom .
595455 12/1947 United Kingdom .
772529 8/1952 United Kingdom .
768727 9/1954 United Kingdom .

Primary Examiner—Scott J. Sugarman
Attorney, Agent, or Firm—Brown, Martin, Haller & McClain

[57] ABSTRACT

A home viewing device comprising a casing for positioning in front of a screen for receiving separate left and right eye images. The viewing device is arranged to display said images on separate left and right eye axes by means of a first fully reflective surface inclined to the axis of the first eye image and for reflecting the image onto a second fully reflective surface for reflecting the first eye image along the viewing axis, and a third fully reflective surface inclined to the axis of the second eye image for reflecting that image onto a semireflective surface for reflecting the second eye image along the viewing axis. Different polarizing means are positioned in the paths of the first and second eye images so that the images are differently polarized whereby a viewer with correspondingly polarized glasses can discern the different images to obtain a three-dimensional effect.

4 Claims, 2 Drawing Sheets

VIEWING DEVICE

This invention relates to a viewing device for viewing an image in three dimensions and to a system for viewing in three dimensions.

Conventional attempts to provide a three-dimensional image on television have involved alternate interlaced left and right eye images on the scans of the television picture and chromatic separation. Such separation does not give true separation and the separate images can only be discerned by the viewer using blue and red glasses. The left and right eye images are therefore drastically distorted by the color separation and, whilst the separation works up to a point, special equipment is required and anybody viewing the picture without the special glasses would see a double image. An object of the present invention is to provide an improved device and system.

According to the present invention there is provided a viewing device for viewing an image in three dimensions combined from separate left and right eye images and using polarized glasses or the like such that one eye discerns images polarized in one manner and the other eye discerns images polarized in another manner, the device comprising first reflective means for receiving one eye image along a first eye axis and for reflecting said one eye image along a viewing axis offset from the first eye axis, means for receiving the other eye image along a second eye axis and for passing said other eye image along the viewing axis in combination with the one eye image, first polarizing means for polarizing the one eye image in the one manner and second polarizing means for polarizing the other eye image in the other manner such that a viewer viewing the combined image along the viewing axis and wearing said polarized glasses or the like will view the image in three dimensions.

Preferably the second eye axis is also offset from the viewing axis although it may be coincident. When offset it includes second reflective means for reflecting the other eye image along the viewing axis. The first and second polarizing means may be crossed polarized or circularly polarized to different degrees.

The invention is particularly applicable to a home viewing device and may comprise in a preferred arrangement a casing for positioning in front of a screen for receiving separate left and right eye images and displaying said images on separate left and right eye axes, a first reflective means for reflecting a first of the eye images onto a viewing axis, said first reflective means comprising a first fully reflective surface inclined to the axis of the first eye image and for reflecting the image onto a second fully reflective surface for reflecting the first eye image along the viewing axis, a second reflective means for reflecting the second eye image onto the viewing axis to be combined with the first eye image, said second reflective means comprising a third fully reflective surface inclined to the axis to the second eye image and for reflecting the image onto a semi-reflective surface for reflecting the second eye image along the viewing axis and through which the first eye image passes, and different polarizing means in the paths of the first and second eye images so that the images are differently polarized and a viewer with corresponding is polarized glasses can discern the different images to obtain a three-dimensional effect.

According to another aspect of the invention there is provided a system for viewing in three-D comprising a screen, such as a television screen on back projection screen, means for displaying left and right eye images simultaneously on the screen side by side or one above the other and a viewing device as specified above for combining the left and right eye images along a single viewing axis so that when polarized in different planes a viewer wearing correspondingly polarized glasses can discern the different images to obtain a three-dimensional effect.

The invention will now be described by way of example with reference to the accompanying drawing in which.

Figure 1:
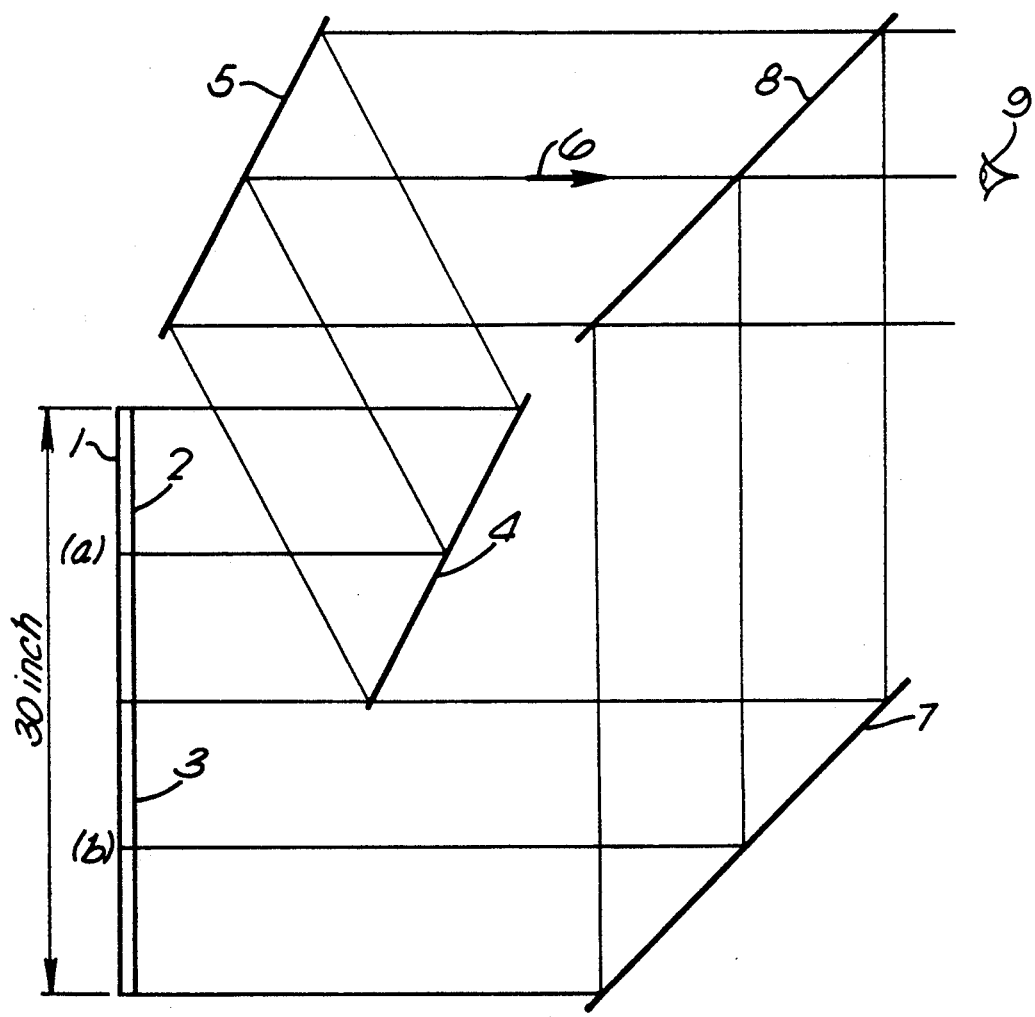
FIG. 1 is a diagrammatic view of the preferred embodiment.

In FIG. 1 a screen 1 is provided with a picture comprising two separate images (a) and (b) one positioned above the other and representing respectively left and right eye images as would be seen by the natural eyes. Positioned in front of the screen 1 are two polarizing screens 2 and 3, the polarizing screen 2 polarizing the image (a) in a positive fashion and the polarizing screen 3 polarizing the image (b) in a negative fashion. Positioned downstream of the displayed image (a) is a first fully reflective mirror 4 inclined at an angle of 62°. The fully reflective mirror 4 reflects the image (a) onto a second fully reflective mirror 5 also positioned at 62° so as to reflect the image (a) along a viewing axis or a direction generally indicated by the arrow 6.

Positioned downstream of the polarizing screen 3 is a third fully reflective mirror 7 inclined at an angle of 45° and arranged to reflect the image (b) onto a two-way mirror 8 also set at 45°. The semi-reflective mirror 8 is positioned to reflect the image (b) along the viewing axis or direction 6 in combination with the image (a) which passes through the two-way mirror.

Figure 3:
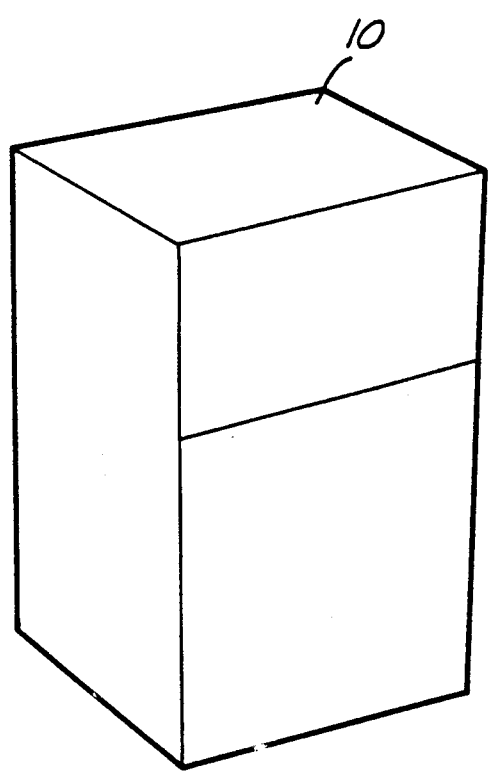
FIG. 3 is a diagrammatic perspective view of a viewing device casing.

In this way the viewer at 9 receives a combined image made up of images (a) and (b) but, by wearing polarized glasses polarized to correspond with the polarizing of the images (a) and (b) the viewer receives a three-dimensional effect since one eye sees only one image and the other eye sees the other image. As indicated in FIG. 1 of the screen is suitably a large 30 inch screen so that a reasonable size picture is seen by the viewer when viewed along the axis 6, the various mirrors being positioned in a movable casing as diagrammatically illustrated in FIG. 3.

Figure 2:
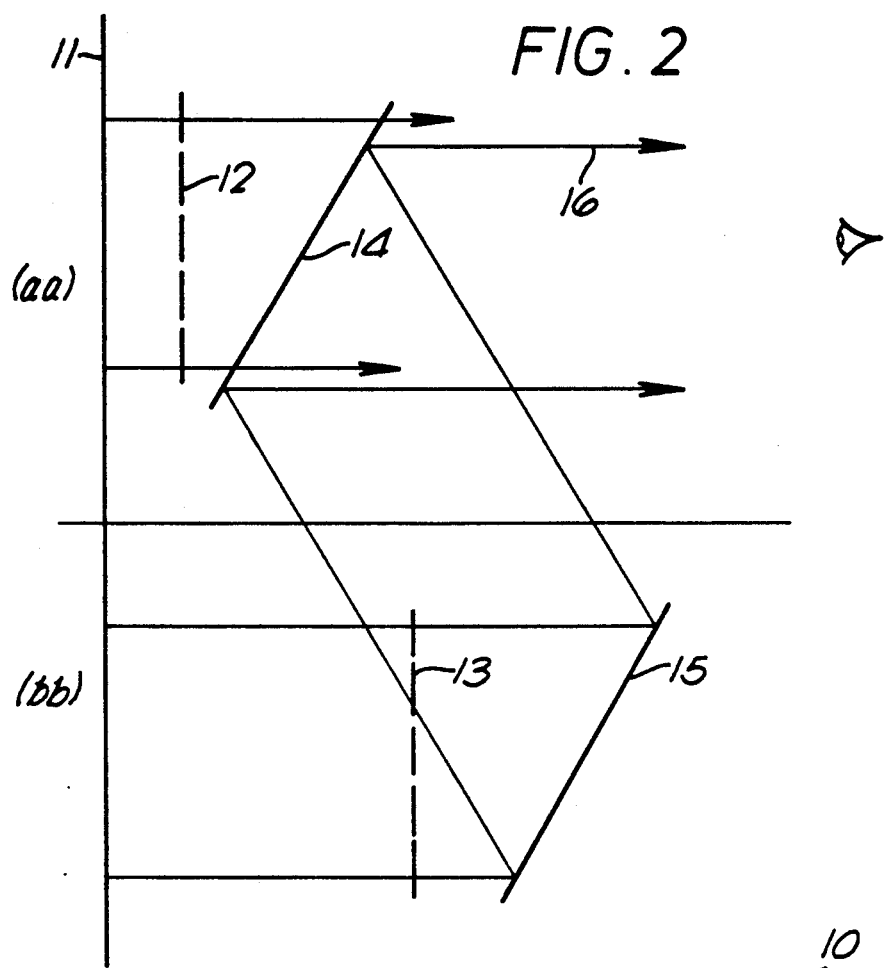
FIG. 2 is a diagrammatic view of a second embodiment.

In FIG. 2 an alternative arrangement is disclosed where one of the two eye images is displayed along the eye axis. Thus, in FIG. 2, a picture is displayed on the screen 11 and includes two distinct and separate images (aa) and (bb) which are images corresponding to left and right eye images as seen by the natural eyes. Positioned in front of each of images (aa) and (bb) are respective polarizing screens 12 and 13 which cross polarize the images. Positioned downstream of the polarizing screen in front of image (aa) is a semi-reflective mirror through which the image (aa) can be seen. Positioned in front of the polarizing screen 13 is a fully reflective mirror 15 which reflects the image (bb) onto the semi-reflective mirror 14 so as to reflect the image (bb) along a view axis 16 in combination with the image (aa). The reflective surfaces of FIG. 2 will also be positioned in a removable casing as disclosed in FIG. 3.

The angles provided by the reflective surfaces disclosed in FIG. 1 are designed to provide the same distance of travel for the images for each eye. In the arrangement of FIG. 2 the distance for the eyes is different and this would have to be corrected by providing an appropriate lens in the path of image (aa) or by displaying (aa) further back than image (bb).

The picture received by the screen 1 or 11 could be a back projection from a film filmed with a two perforation pull down but projected with four perforations. Alternatively, two projectors could be used one for each eye image. Using a single projector various different formats can be used;

providing two techniscope format pictures simultaneously with two per frame and then projecting with a conventional techniscope projector;

by providing a special adaptation for the projector so as to have a pull down of eight perforations instead of four so as to project two full frames. This can be done by opening the gate of a projector so as to project two full frames. This would have the advantage of providing better definition quality although for display on a home screen of 30 inches by 40 inches a single split frame would be adequate; or shooting the original picture on a camera with a three perforation pull down and projecting two images by adapting the projector to provide a six perforation pull down.

One big advantage of the present invention is that by using the split frame technique the film can be transferred onto video by conventional transfer from film to tape. Thus using 35 mm film the conventional equipment is a four perforation pull down telecine machine and this can be used with a split frame where each frame comprises two perforations. Whereas with the chromatic separation system for previous attempts a viewer would see a double image if not using special glasses, with the present invention a viewer would see two clear but distinct images positioned either one above the other or side by side if no combining box as disclosed in FIGS. 1 or 2 were provided.

If it were desired to provide a viewing position for a viewer without glasses in addition to the position where the two separate images have been combined for three-dimensional viewing then a further fully reflective surface could be positioned downstream of the semi-reflective mirror 8 in FIG. 1 in order to reflect only the image (b) along a second viewing position. In such a situation a further polarizing device would have to be provided to counter the previous polarization.

Whilst it is preferred to sue cross polarizing screens with the present invention it may be that the use of circular polarizers may allow the viewer more head movement without loosing the three-dimensional effect.

What is claimed is:

1. A viewing device for an image in three dimensions combined from separate left and right eye images and using polarization means such that one eye discerns images polarized in one manner and the other eye discerns images polarized in another manner, the device comprising first reflective means for receiving one eye image along a first eye axis and for reflecting said one eye image along a viewing axis offset from the first eye axis, second reflective means for receiving the other eye image along a second eye axis offset from the viewing axis and for reflecting said other eye image along the viewing axis in combination with the one eye image, first polarizing means for polarizing the one eye image in the one manner and second polarizing means for polarizing the other eye image in the other manner such that a viewer viewing the combined image along the viewing axis and wearing said polarization means will view the image in three dimensions.

2. A viewing device according to claim 1 wherein the first and second polarizing means are crossed polarized.

3. A home viewing device comprising a casing for positioning in front of a screen for receiving separate left and right eye images and displaying said images on separate left and right eye axes, a first reflective means for reflecting a first of the eye images onto a viewing axis, said first reflective means comprising a first fully reflective surface inclined to the axis of the first eye image and for reflecting the image onto a second fully reflective surface for reflecting the first eye image along the viewing axis, a second reflective means for reflecting the second eye image onto the viewing axis to be combined with the first eye image, said second reflective means comprising a third fully reflective surface inclined to the axis of the second eye image and for reflecting the image onto a semi-reflective surface for reflecting the second eye image along the viewing axis and through which the first eye image passes, and different polarizing means in the paths of the first and second eye images so that the images are differently polarized and a viewer with correspondingly polarized glasses can discern the different images to obtain a three-dimensional effect.

4. A system for viewing the three-D comprising a screen, such as a television screen or back projection screen, means for displaying left and right eye images simultaneously on the screen side by side or one above the other and a viewing device comprising first reflective means for receiving one eye image along a first eye axis and for reflecting said one eye image along a viewing axis offset from the first eye axis, second reflective means for receiving the other eye image along a second eye axis offset from the viewing axis and for reflecting said other eye image along the viewing axis in combination with the one eye image, first polarizing means for polarizing the one eye image in the one manner and second polarizing means for polarizing the other eye image in the other manner such that the left and right eye images are combined along the single viewing axis so that when polarized in different planes a viewer wearing correspondingly polarized glasses can discern the different images to obtain a three-dimensional effect.

* * * * *